Oct. 13, 1931.  C. T. SIEBS  1,827,210
METHOD OF WELDING
Original Filed May 22, 1926
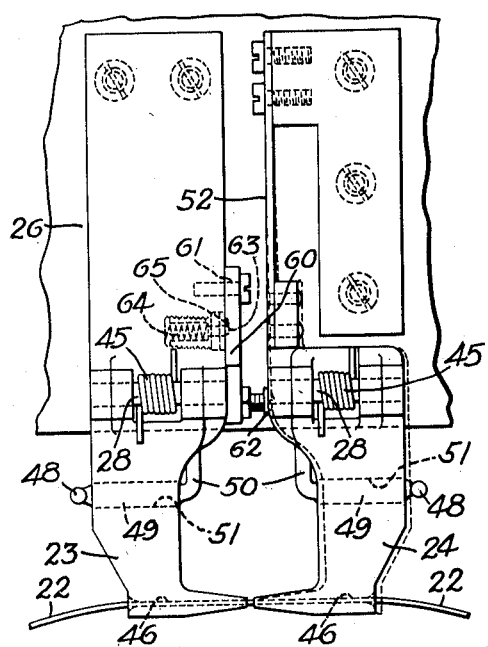
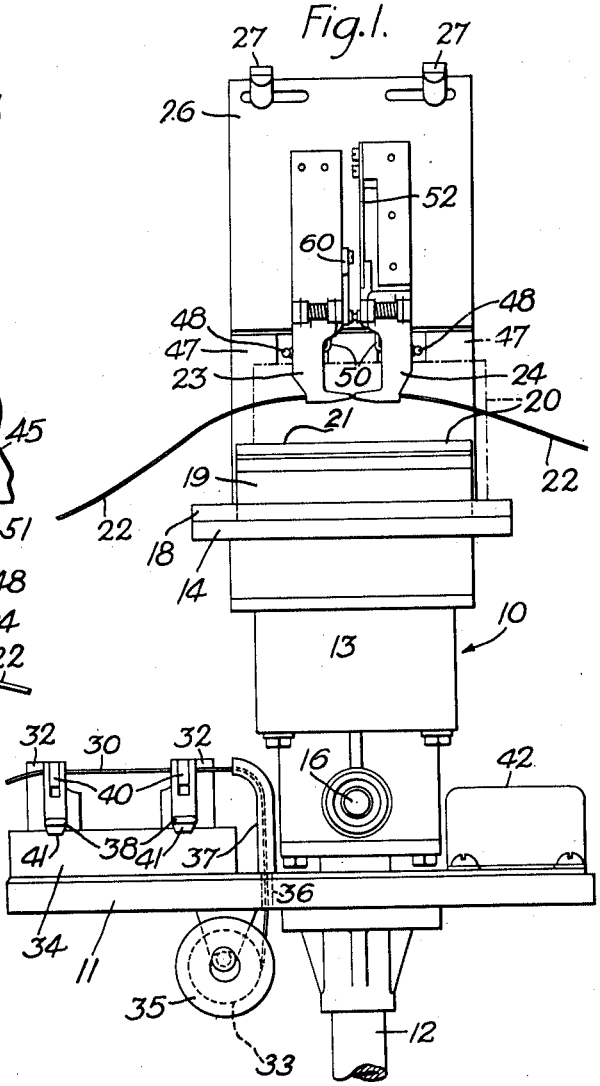
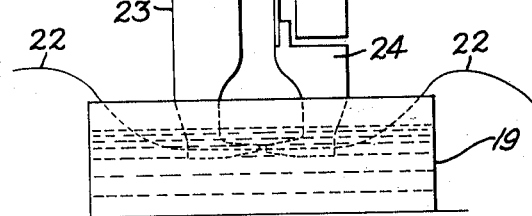
Inventor
Claude T. Siebs
by *H.A. Pattison*
Atty.

Patented Oct. 13, 1931

1,827,210

UNITED STATES PATENT OFFICE

CLAUDE THEODORE SIEBS, OF CRANFORD, NEW JERSEY, ASSIGNOR TO WESTERN ELECTRIC COMPANY, INCORPORATED, OF NEW YORK, N. Y., A CORPORATION OF NEW YORK

METHOD OF WELDING

Original application filed May 22, 1926, Serial No. 110,888. Divided and this application filed December 4, 1928. Serial No. 323,591.

This invention relates to a method of welding, and more particularly to a method of electrically butt welding wires or other materials in which a smooth, uniform and strong weld is highly desirable.

This application is a division of my copending application Serial No. 110,888, filed May 22, 1926.

The principal object of the present invention is to provide an improved and inexpensive method of welding which will produce joints of uniform quality having as great strength as the material being welded and having substantially the same cross-section.

Another object of the invention is to provide a method of welding materials such as nickel-chrome alloys which when exposed to the atmosphere while heated are readily oxidized producing a weak joint or completely preventing a union of the material.

The invention contemplates a method of welding wherein the parts to be welded are immersed in an electric and thermal insulating non-oxidizing fluid while an electrical current is passed through the parts to produce the weld. In accordance with one embodiment of the invention, particularly adapted for welding materials such as nickel-chrome alloys, the parts to be welded are immersed during the welding operation in a non-conducting and non-oxidizing fluid such as paraldehyde, heptaldehyde or carbon tetrachloride to prevent oxidization and over-heating of the parts.

It is believed that a clear understanding of the invention may be had by referring to the following detailed description taken in conjunction with the accompanying drawings which illustrates a welding apparatus by means of which the improved method may be practiced. It should be understood, of course, that the method of the present invention is not limited to the specific apparatus herein illustrated and described, but may be practiced to advantage by the use of various other types of welding apparatus.

In the accompanying drawings,

Fig. 1 is a front elevational view of a welding apparatus by means of which the method may be practiced, Fig. 2 is an enlarged fragmentary detail view of the jaws of the welding apparatus; and Fig. 3 is a diagrammatic view of the electrical welding circuit.

Referring to the drawings in which similar reference characters designate the same parts in the various views, the welding apparatus is indicated generally by the numeral 10 and is mounted on a base 11 which is supported by a stand or pedestal 12. A casing 13 extends from the base 11 to a flat portion or shelf 14 and is adapted to house a transformer 15, a push button 16 being mounted in the casing to operate a switch 17 in the primary circuit of the transformer. One of the terminals of the secondary of the transformer leads directly to a welding jaw 23 while the other terminal leads to a nickel fuse 30 and a variable resistance or rheostat 31 in parallel therewith before reaching a second welding jaw 24. The terminals of the secondary also lead to two annealing terminals 27—27 in which the wires are annealed after being welded.

The purpose of the rheostat in parallel with the nickel fuse is to permit the adjustment of the circuit to obtain the desired temperature-resistance characteristic of the circuit. The variation of the resistance of the rheostat due to temperature is practically negligible and, therefore, the combination of the rheostat and the nickel fuse in parallel will produce any desired characteristic within the limits of the two elements. When the rheostat is once set it need not be altered even though the fuse wire diameter is increased for increased sizes of wire to be welded. The rheostat is housed under a hood 42 and when it has been set, the hood is fastened to the base 11 by screws in order to maintain the desired adjustment against accidental displacement and to prevent its adjustment being altered by the operator.

An insulating block 34 is mounted on the base 11 opposite the rheostat hood and serves to support two clamps 32—32 between which the nickel fuse is placed. On the under side of the base 11 a reel 35 of nickel wire 33 is carried, which passes from the reel through a hole 36 in the base and through a tube 37 to the clamps. Each clamp is provided with a lever arm 38, a downward pressure on which will open the jaws 40 of the clamp to allow the insertion of the nickel fuse wire 33 which is engaged by the jaws upon release of the arm due to the action of a spring 41.

The shelf on the top of the casing 13 is surrounded by a strip of material forming a raised edge 18 for the purpose of preventing a vessel 19 from being accidentally displaced from the table. The vessel 19 contains a non-oxidizing liquid such as carbon tetrachloride and is provided with a lid 20 to prevent evaporation of the contents during the intervals between the welding operations. The top of the lid 20 has a polished or mirrored surface 21 to facilitate placing the wires 22 in the jaws 23 and 24 of the welding apparatus.

A base plate 26 is supported on the casing by two arms 47 and serves to carry the welding jaws 23 and 24 and the annealing terminals 27—27. Each annealing terminal consists of a post of semi-circular cross-section with a spring on the flat side to clamp a wire therebetween for the purpose of annealing it after it has been welded. The distance between the terminals is made variable to vary the resistance included between them and thereby regulate the amount of current and the annealing temperature.

The welding jaws 23 and 24 (shown in detail in Fig. 2) comprise a fixed and a movable part and are adapted to open to permit the insertion of the wires 22 by mounting the movable part of each jaw on a pivot 28, the jaws being maintained in a closed position by springs 45. A diamond shaped groove 46 is provided between the fixed and movable part of each jaw to receive the wire to be welded. The opening of the jaws is accomplished through a lever 48 which has an oval portion 49 cooperating with similarly shaped grooves 51 so that upon a downward movement of the lever the mouth of the jaw will be spread. The lever is also provided with an extension 50 which is adapted to strike the base plate 26 upon a slight upward movement of the lever and permit only a limited spreading of the jaw members. In order to insert a wire in the jaw the lever is moved upwardly, the spreading of the members in this instance being just sufficient to slightly separate the jaw, so that the wire may be inserted into the groove of the jaw from the end. Otherwise it might be difficult to get a flexible wire of small cross-section to lie properly in the groove. When the weld is complete the wire is removed from the jaws by completely opening them through a downward movement of the lever.

The jaw 23 is rigidly mounted on the base plate 26 while the jaw 24 is attached to a flat spring 52 to permit the latter jaw to move to the dotted line position shown in Fig. 2 upon the raising of a bell crank lever 60 which is pivoted at 61 on the fixed jaw. The lower end of the lever carries a screw 62 insulated from the lever the round head of which acting as a cam engages the side of the jaw 24 when the lever is raised, forcing the jaw 24 away from the fixed jaw 23 to the position indicated by the dotted line in Fig. 3. The jaw 23 is provided with a plunger 63 which is urged by a spring 64 against the lever 60, which has two depressions 65 which are engaged by the plunger to hold the lever in either of two positions. To place the wires 22 in the welding jaws the lever 60 is first raised pushing the jaw 24 to its outermost position. The wires are then inserted in the jaws in such a manner that their ends abut and the lever 60 is then moved downward to release the jaw 24 and allow the spring 52 to exert a pressure on the abutting ends of the wires.

When practicing the invention in the welding of .011 inch "permalloy" (nickel-iron) wire, a nickel fuse wire of .008 inches diameter is used in the welding circuit. The comparatively low resistance of such a fuse when cold will allow a large rush of current at the beginning of the welding operation quickly bringing the wires to a welding temperature. As the temperature of the fuse increases, its resistance is rapidly increased, on account of the high positive temperature coefficient of this metal, thus tapering or reducing the current to that which will produce an annealing temperature. After the current has flowed at a predetermined rate for a given time the nickel wire will fuse and open the welding circuit. By using a nickel fuse in this manner it is possible to supply a current of such magnitude as to raise the parts to a welding temperature within a very short time and thereby reduce the time during which the parts are exposed to the deleterious chemical and physical effects which appear to accompany high temperatures of long duration. The nickel fuse may be so chosen and the parallel resistance so adjusted that when the desired temperature is attained the fuse will interrupt the welding circuit or in certain instances where it is desirable, the nickel fuse may be so chosen and the resistance so adjusted as to reduce the temperature as soon as the weld is complete and maintain the temperature at an annealing temperature for a short interval before the welding circuit is interrupted. The resistance of the nickel wire increases many times before the temperature reaches the fusing temperature of 1452° C. and when it does reach this temperature the nickel wire fuses without explosion such as takes place when iron or other metals having a high positive temperature coefficient are used. Nickel further has the advantage of being inexpensive and easily drawn to the sizes suitable for use in practicing the invention, particularly when welding small sizes of wire.

The fuse is placed in the welding circuit by drawing a small length of it from the reel under the base and clamping it between the jaws 32—32. When the fuse is in position the wires to be welded are placed in the welding jaws, the lid 20 is removed and the vessel 19 is raised until the welding jaws and the portions of the wires to be welded are submerged in the carbon tetrachloride contained in the vessel 19. The button 16 is then pressed closing the primary circuit of the transformer and causing a large rush of current through the secondary winding thereof. The carbon tetrachloride in which the wires are immersed is a poor conductor of both electricity and heat and when a material is immersed therein and heated to the temperatures attained in welding only a small portion of the liquid immediately surrounding the heated portion is raised to a boiling temperature and formed into a gas. Although experiments have shown that the invention may be practiced advantageously by using carbon tetrachloride, it will be understood that other electric and thermal insulating, non-oxidizing fluids may be used with beneficial results.

When the wires to be welded have attained the welding temperature the current will have been greatly reduced as pointed out above and the heat of vaporization incident to the formation of the gas absorbs sufficient heat from the material to chill the exterior of the weld, thereby preventing an enlargement at the weld and a restriction at either side of it, which are well known phenomena encountered in the butt welding of wires and are perhaps due to the tendency of a liquid to assume a spherical shape. The absorption of heat also assists in reducing the temperature of the wires to an annealing temperature before the nickel fuses, for the welding temperature is required only momentarily and the danger of overheating and burning the weld is thereby obviated. The odor of the carbon tetrachloride gas is not unpleasant and is harmless.

As soon as the nickel wire fuses the button 16 is released, the vessel 19 is returned to the table, the welded wire removed from the welding jaws and placed between the annealing terminals. The button 16 is again pressed until the wire attains a dark red glow, is then released and the wire removed, the weld being complete.

Annealing the wire for some distance on either side of the weld is desirable because the material in the weld may be hardened by the welding process and if it is attempted to bend the welded wire, the bending may all occur in the softer metal adjoining the weld. By slowly annealing a longer portion of the wire the variation in hardness along the wire is gradual and there will be no tendency for the wire to break on account of sharp bending at a junction of hard and soft metal.

It will be understood that the embodiment of the invention herein described and illustrated is merely a convenient and useful form of the invention, which is capable of many other modifications without departing from the spirit and scope of the invention.

What is claimed is:

1. A method of welding nickel-iron alloys which comprises immersing the parts to be welded in carbon tetrachloride, and while the parts are in contact passing an electric current therebetween to heat the parts to welding temperature, thereby liberating carbon from the carbon tetrachloride for uniting with the alloy of the heated parts, and forcing the parts together to form a weld.

2. A method of welding, which comprises immersing the parts to be welded in carbon tetrachloride to prevent oxidation and overheating of the parts, and passing an electrical current through the parts while forcing the parts together under pressure to form a weld.

3. A method of welding ferrous metal parts having a low carbon content which consists in immersing the parts to be welded in carbon tetrachloride, and passing an electrical current through the parts while holding the parts together to produce a weld.

4. A method of welding which comprises immersing the parts to be welded in a liquid containing carbon and chlorine, and passing an electrical current through the parts while forcing the parts together to produce a weld.

5. A method of welding nickel-iron alloys which comprises immersing the parts to be welded in carbon tetrachloride, holding the parts in contact with each other, and passing an electrical current through the parts to heat them to welding temperature and to cause the carbon tetrachloride to liberate carbon and chlorine for producing a smooth and durable weld of the desired content.

6. In electric welding, the step of protecting the parts to be welded by surrounding them with an atmosphere of carbon tetrachloride.

7. In electric welding wherein the parts to be welded are forced together under pressure when at welding temperature, the step of protecting from oxidation the parts to be welded by surrounding them with carbon tetrachloride.

In witness whereof, I hereunto subscribe my name this 22nd day of November, A. D., 1928.

CLAUDE THEODORE SIEBS.